United States Patent
Teagle et al.

(10) Patent No.: US 8,790,613 B2
(45) Date of Patent: Jul. 29, 2014

(54) TREATED ELECTROLYTIC MANGANESE DIOXIDE AND METHOD FOR ITS PRODUCTION

(75) Inventors: John A. Teagle, Queen Anne, MD (US); Oliver Schilling, Severna Park, MD (US); Mayra C. Sanchez, Valdez, AK (US)

(73) Assignee: Erachem Comilog, Inc., Baltimore, MD (US)

(*) Notice: Subject to any disclaimer, the term of this patent is extended or adjusted under 35 U.S.C. 154(b) by 515 days.

(21) Appl. No.: 13/034,101

(22) Filed: Feb. 24, 2011

(65) Prior Publication Data
US 2011/0206996 A1 Aug. 25, 2011

Related U.S. Application Data

(60) Provisional application No. 61/307,842, filed on Feb. 24, 2010.

(51) Int. Cl.
*C01G 25/02* (2006.01)
*C01G 45/02* (2006.01)
*H01M 4/13* (2010.01)
*H01M 4/24* (2006.01)
*H01M 4/50* (2010.01)
*H01M 10/0525* (2010.01)

(52) U.S. Cl.
CPC .............. *C01G 45/02* (2013.01); *C01P 2006/40* (2013.01); *H01M 4/13* (2013.01); *H01M 4/244* (2013.01); *H01M 4/50* (2013.01); *H01M 10/0525* (2013.01); *Y02E 60/122* (2013.01); *Y02E 60/124* (2013.01)
USPC ........................................................ 423/605

(58) Field of Classification Search
USPC .......... 423/605; 205/57; 204/157.51; 429/224
See application file for complete search history.

(56) References Cited

U.S. PATENT DOCUMENTS

| | | | |
|---|---|---|---|
| 5,078,889 A * | 1/1992 | Higgins et al. | 210/683 |
| 5,082,570 A * | 1/1992 | Higgins et al. | 210/683 |
| 5,698,176 A * | 12/1997 | Capparella et al. | 423/605 |
| 5,744,266 A * | 4/1998 | Nunome et al. | 429/224 |
| 5,863,675 A * | 1/1999 | Capparella et al. | 429/224 |
| 5,928,714 A * | 7/1999 | Nunome et al. | 427/126.3 |
| 6,190,800 B1 * | 2/2001 | Iltchev et al. | 429/224 |
| 6,503,539 B2 * | 1/2003 | Gestrelius et al. | 424/549 |
| 6,720,009 B2 * | 4/2004 | Gestrelius et al. | 424/549 |
| 7,045,252 B2 * | 5/2006 | Christian et al. | 429/224 |
| 7,294,352 B2 * | 11/2007 | Gestrelius et al. | 424/549 |
| 2001/0033823 A1 * | 10/2001 | Kuniyoshi et al. | 423/520 |

OTHER PUBLICATIONS

Malloy et al., "Surface characterization of heat-treated electrolytic manganese dioxide," Journal of Colloid and Interface Science 285 (2005) 653-664.*

* cited by examiner

*Primary Examiner* — Anthony J Zimmer
(74) *Attorney, Agent, or Firm* — Squire Patton Boggs (US) LLP

(57) ABSTRACT

A method for preparing treated electrolytic manganese dioxide and a battery including the treated electrolytic manganese dioxide as an electrode are provided. The method for treating the electrolytic manganese dioxide includes suspending milled electrolytic manganese dioxide in an aqueous solution heated to a temperature between ambient and boiling, and adjusting an acidity of the aqueous solution to a pH of less than 3.3. The method further includes agitating the suspended milled electrolytic manganese dioxide in the aqueous solution for a predetermined amount of time to dissolve metal-containing particulates in the milled electrolytic manganese dioxide.

7 Claims, 6 Drawing Sheets

TREATED ELECTROLYTIC MANGANESE DIOXIDE AND METHOD FOR ITS PRODUCTION

CROSS REFERENCE TO RELATED APPLICATIONS

This is a non-provisional application of U.S. Provisional Patent Application Ser. No. 61/307,842, filed on Feb. 24, 2010. The subject matter of this earlier filed application is hereby incorporated by reference.

BACKGROUND

1. Field

Embodiments of the invention relate to a method for preparing treated electrolytic manganese dioxide (EMD). More specifically, certain embodiments of the invention are directed to a method and a system for preparing treated EMD to prevent metal-containing particulates formed, for example, during the milling or other handling of the EMD from causing problems, such as an internal short in a battery.

2. Description of the Related Art

EMD is commonly used as an active material for dry battery cells because it is an inexpensive and abundant material and it provides excellent discharge and long-term storage performance. For example, EMD is used as a cathode-active material in a primary alkaline or lithium battery or as a precursor for an active material of a positive electrode in a lithium-ion battery.

EMD is typically prepared by passing a direct current through an acidic solution of manganese sulfate and sulfuric acid. The positive electrode of this plating may include a plate of titanium onto which the EMD is deposited. The negative electrode may be made of graphite or copper, or similar material. The deposited EMD is mechanically removed from the titanium plate after it has reached a thickness of about 1 mm to about 75 mm. The EMD pieces removed from the titanium plate are reduced in size to meet the requirements of the battery manufacturer using a grinding or milling process. The resulting EMD product is referred to as milled EMD.

The size reduction of the EMD pieces generally occurs in a mill. Because of the hardness of the EMD, the mill frequently uses steel parts to grind the EMD to a specific size. During the milling process, these steel parts may wear, causing metallic impurities to be introduced into the EMD. In some cases, the impurities may not be a piece of steel; rather the impurities may include a piece of rust or other contaminant. These impurities will hereinafter be referred to as metal-containing particulates.

Because EMD is prepared in an acidic bath, the preparation of EMD generally requires a washing and/or caustic treatment of the EMD to neutralize the acidity of the bath. This treatment may be performed before or after the milling of the EMD.

In a final step, the EMD is dried to certain specifications. For example, for primary alkaline-battery applications, the drying step is generally mild, leaving behind the chemically bound water and physisorbed water, which may range from about 1% to about 3% of the product weight. The resulting material is the active material for primary alkaline batteries.

For primary-lithium-battery applications, the active material is prepared by removing all water, whether chemical or physisorbed, to avoid any reaction with the organic electrolyte and/or the metallic lithium in the battery.

When EMD is used as a precursor for an active material of a positive electrode in lithium-ion batteries, EMD powder is reacted with a lithium salt (e.g., lithium carbonate) and potential dopants at temperatures between 600° C. and 900° C.

None of these steps for preparing the EMD, which may occur after the milling process, are designed to remove the metal-containing particulates.

The metal-containing particulates included with the positive electrode of the battery may, in the presence of an electrolyte, be converted to dissolved metal ions. The ions may migrate to the negative electrode, where they may be reduced back to a metal. Subsequent ions may also be reduced on the surface of this metal that is in contact with the negative electrode. Through repeated depositions, a metallic chain may develop that leads through the pores of the separator, causing an internal short in the battery. This internal short will, in a best case scenario, slowly discharge the battery and render the battery inoperable. In a worst case scenario, the internal short will rapidly discharge the battery and could generate significant heat, potentially causing a battery containing organic electrolytes to vent, catch fire, or even explode.

The generation of the internal short is directly linked to a large number of metal atoms that are concentrated within a small volume within the positive electrode of the battery. These atoms, after dissolution into ions, will seek a short path to the negative electrode and reconstitute as a metallic impurity within a similarly small volume of the separator. This high concentration of metal atoms near, and eventually in, the separator causes the battery to short. If the same number of atoms was more widely distributed in the positive electrode, an insufficient number of metal atoms would coalesce on the negative electrode to form a conductive path to the positive electrode, thereby preventing the internal short.

The metal-containing particulates that have been identified as causing a majority of internal shorts in batteries include Fe for lithium-ion batteries and Cu for primary alkaline batteries.

SUMMARY

In accordance with an embodiment of the invention, there is provided a method for preparing treated EMD. The method includes suspending milled EMD in an aqueous solution heated to a temperature between ambient and boiling, and adjusting an acidity of the aqueous solution to a pH of less than 3.3. The method further includes agitating the suspended milled EMD in the aqueous solution for a predetermined amount of time to dissolve metal-containing particulates in the milled EMD.

In accordance with another embodiment of the invention, there is provided a system, which includes means for suspending milled EMD in an aqueous solution heated to a temperature between ambient and boiling, and means for adjusting an acidity of the aqueous solution to a pH of less than 3.3. The method further includes means for agitating the suspended milled EMD in the aqueous solution for a predetermined amount of time to dissolve metal-containing particulates in the milled EMD.

In accordance with another embodiment of the invention, there is provided a battery, including a negative electrode, an electrolyte, and a positive electrode including treated EMD. The treated EMD includes a reduced amount of particulate metal.

In accordance with another embodiment of the invention, there is provided a battery including a negative electrode, an electrolyte, and a positive electrode including an active material prepared from treated EMD. The active material includes a reduced amount of particulate metal.

BRIEF DESCRIPTION OF DRAWINGS

Further aspects, details, advantages and modifications of the invention will become apparent from the following detailed description of the embodiments, which is to be taken in conjunction with the accompanying drawings, in which.

DETAILED DESCRIPTION

It will be readily understood that the components of the invention, as generally described and illustrated in the figures herein, may be arranged and designed in a wide variety of different configurations. Thus, the following detailed description of the embodiments of the method and a system for preparing treated EMD, and batteries containing the treated EMD as an electrode, as represented in the attached figures, is not intended to limit the scope of the invention as claimed, but is merely representative of selected embodiments of the invention.

Embodiments of the invention provide for the conversion of metal-containing particulates formed during the milling or the handling of EMD by introducing the milled EMD into an aqueous solution having an acidity and an oxidation-reduction potential (ORP), whereby the ORP of the aqueous solution converts the metal-containing particulates to their oxidized form, and the acidity of the aqueous solution promotes the dissolution of the oxidized metal-containing particulates from the milled EMD. Certain embodiments of the invention further provide a treated EMD composition substantially free of metal-containing particulates, and a battery including an active material derived from the treated EMD.

Figure 1:
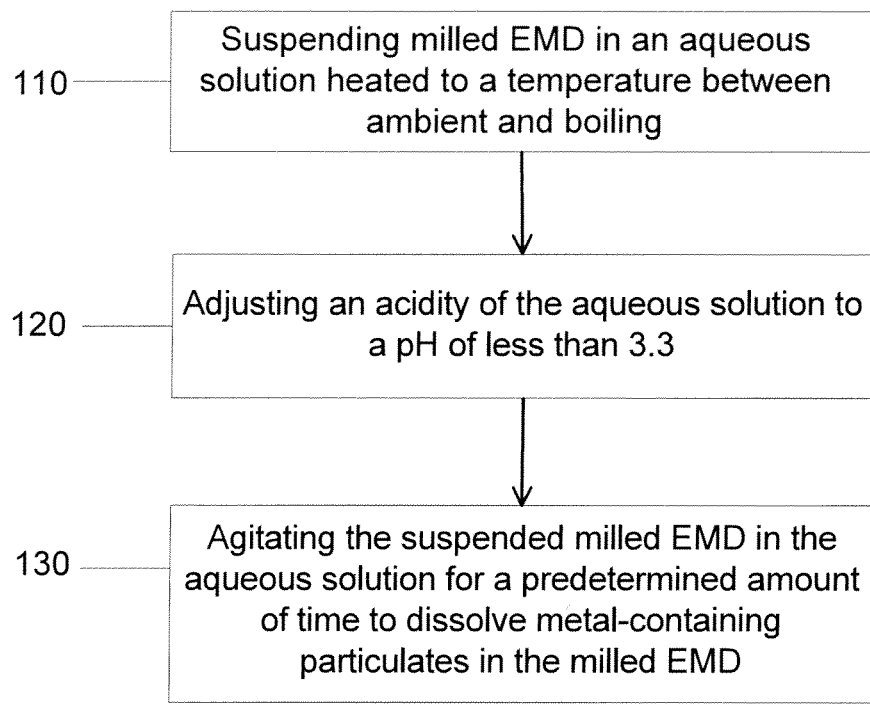
FIG. 1 shows a flow diagram of a method for preparing treated EMD, in accordance with an embodiment of the invention.

FIG. 1 shows a flow diagram of a method for preparing treated EMD, in accordance with an embodiment of the invention. The method includes suspending, at 110, milled EMD in an aqueous solution heated to a temperature between ambient and boiling, and adjusting, at 120, an acidity of the aqueous solution to a pH of less than 3.3. The method further includes agitating, at 130, the suspended milled EMD in the aqueous solution for a predetermined amount of time to dissolve metal-containing particulates in the milled EMD. As can be appreciated by those skilled in the art, the order in which these steps are executed can be changed. For example, the milled EMD may be added to water, which may then be heated. The acidity of the aqueous solution may then be adjusted with sulfuric acid, as needed, to achieve a pH of 3.3 or less.

The aqueous solution is heated to a temperature above 29° C., and more preferably to a temperature ranging from 30° C. to 70° C. The aqueous solution may include water, for example, distilled, well, potable or treated water as long as the water is not saturated with dissolved copper Cu or iron Fe ions.

Adding the milled EMD includes increasing an oxidation-reduction potential of the aqueous solution.

The aqueous solution is agitated for a predetermined time ranging from 30 minutes to 3 hours, and more preferably for a predetermined time of less than 2 hours. The aqueous solution is also agitated so that the metal-containing particulates in the milled EMD are suspended in the aqueous solution.

Figure 2:
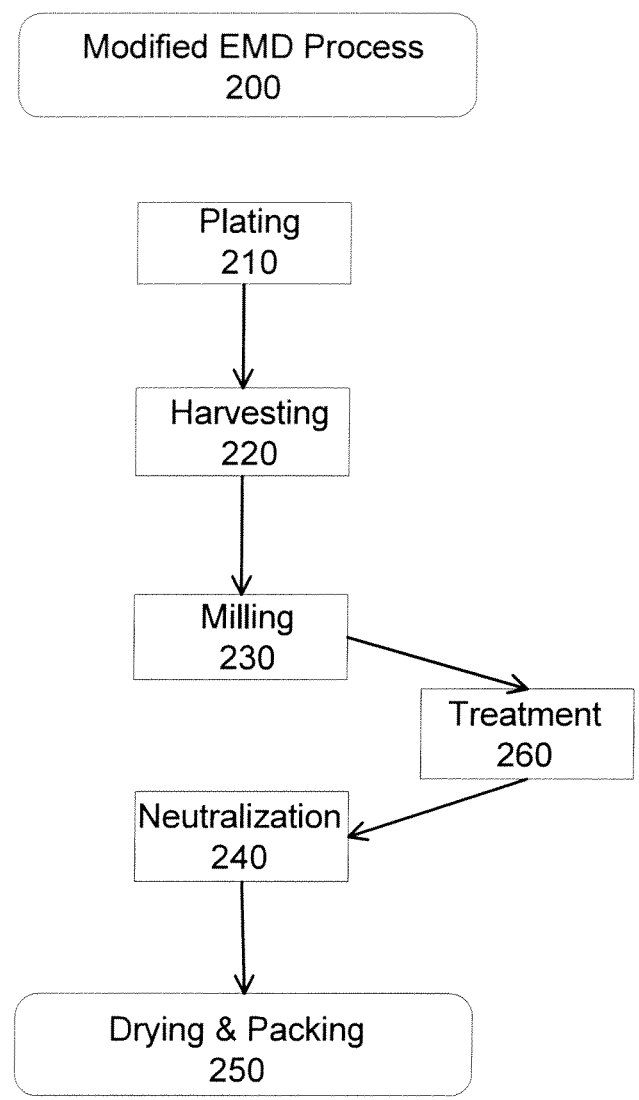
FIG. 2 shows a flow diagram of a modified EMD process for preparing treated EMD using the method shown in FIG. 1, in accordance with an embodiment of the invention.

FIG. 2 shows a flow diagram of a modified EMD process for preparing treated EMD 200 using the method shown in FIG. 1, in accordance with an embodiment of the invention. As shown in FIG. 2, the modified EMD process 200 for preparing treated EMD 200 may include plating, at 210, an electrode, harvesting, at 220, the EMD mechanically removed from the plated electrode, milling, at 230, the EMD, neutralizing, at 240, an acidity of an acidic bath used to wash or treat the milled EMD, and drying and packaging, at 250, the EMD. As further shown in FIG. 2, the modified EMD process 200 may include treating, at 260, the milled EMD using the method shown in FIG. 1, and discussed in detail above. The treating, at 260, of the milled EMD produces a treated EMD that can then be neutralized using the neutralizing at 240.

Figure 3:
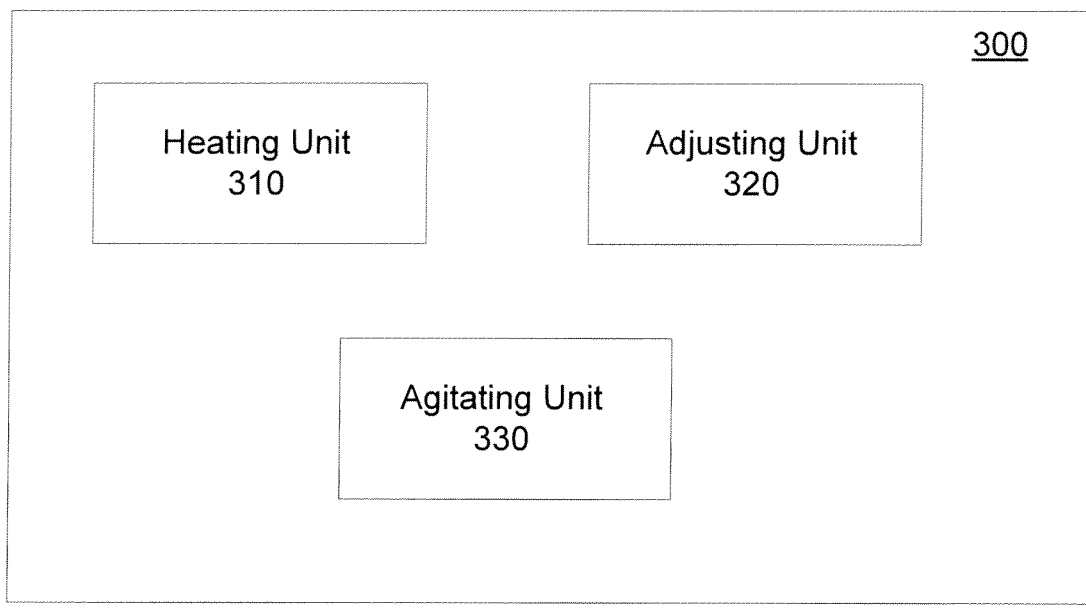
FIG. 3 shows a schematic diagram of a system, in accordance with an embodiment of the invention.

FIG. 3 shows a schematic diagram of a system configured to prepare treated EMD, in accordance with an embodiment of the invention. In accordance with an embodiment of the invention, the system 300 includes a suspending unit 310 configured to suspend milled EMD in an aqueous solution heated to a temperature between ambient and boiling, and an adjusting unit 320 configured to adjust an acidity, if needed, of the aqueous solution to a pH of less than 3.3. The system 300 further includes an agitating unit 330 configured to agitate the suspended milled EMD in the aqueous solution for a predetermined amount of time to dissolve metal-containing particulates in the milled EMD.

Figure 4:
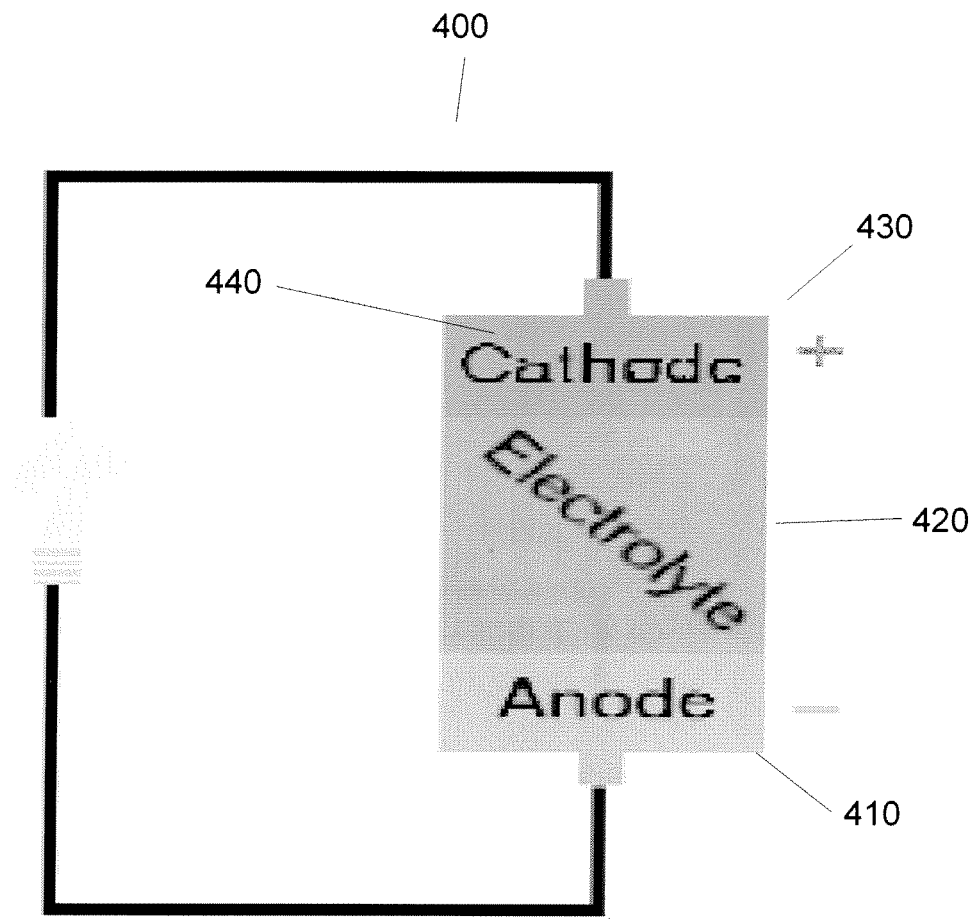
FIG. 4 shows a primary battery, in accordance with an embodiment of the invention.

FIG. 4 shows a primary battery, in accordance with an embodiment of the invention. In accordance with an embodiment of the invention, a battery 400 includes a negative electrode 410, an electrolyte 420, and a positive electrode 430. The positive electrode 430 includes treated EMD 440, which includes a reduced amount of particulate metal.

In accordance with an embodiment of the invention, the battery 400 includes an alkaline battery, the negative electrode 410 includes zinc, and the electrolyte 420 includes potassium hydroxide.

In accordance with another embodiment of the invention, the primary battery 400 includes a primary lithium battery. The negative electrode 410 of the primary lithium battery may include a lithium metal and the electrolyte 420 may include a lithium-containing organic solvent. In this embodiment, the treated EMD 440 is heated before use as the positive electrode 430.

In accordance with another embodiment of the invention, there is provided a battery 400 which includes a negative electrode 410, an electrolyte 420, and a positive electrode 430. The positive electrode 430 includes an active material prepared from treated EMD 440. The active material includes a reduced amount of particulate metal.

In accordance with an embodiment of the invention, the pH is measured, for example, with a commercially available combination electrode and pH meter. The ORP is measured, for example, with a commercially available probe connected to a meter. The probe includes a positive electrode, for example, a platinum wire, and a reference electrode, for example, an Ag/AgCl electrode, as the negative electrode. A potential difference between the positive electrode and the reference electrode is read, for example, by the meter and expressed in millivolts mV.

Experiments 1-11 demonstrate that sodium persulfate is a good oxidizer for increasing the ORP and sulfuric acid is a good reagent for adjusting the acidity of an aqueous solution. In each of the following experiments, sodium persulfate and sulfuric acid are added in specific amounts to oxidize and dissolve copper particulates added to the aqueous solution. These experiments further demonstrate that EMD increases the ORP of the aqueous solution to higher levels than can be obtained using sodium persulfate, and therefore would be more effective in contributing to the conversion and dissolution of metal-containing particulates in milled EMD.

Experiment 1

1.12 grams of a high-chromium tool steel and 7.15 grams of sodium persulfate were added to 100 ml of distilled water at room temperature. The acidity of the aqueous solution was adjusted with sulfuric acid until the pH reached 1.49. The resulting solution was green in color, indicating the conversion of the steel (i.e., the oxidation and dissolution of the chromium from the tool).

Experiment 2

750 ml of distilled water was heated to 50° C. and its pH adjusted with sulfuric acid to 2.0. 15 g of sodium persulfate was added to increase the ORP of the aqueous solution. The aqueous solution was stirred by an overhead agitator. Then 0.0770 g of electrolytic iron powder with a size of less than 100 mesh was introduced to the aqueous solution. After 120 min, the agitation was stopped. No iron powder was present, as evidenced by visual inspection. A solution sample was taken that was subsequently analyzed for dissolved Fe by means of a spectrometer. The amount of dissolved Fe was expressed as the percentage of total amount of Fe that had been added initially. The results indicated that within the uncertainty of the measurement that 88% of the iron powder had been converted into dissolved iron ions.

Figure 5:
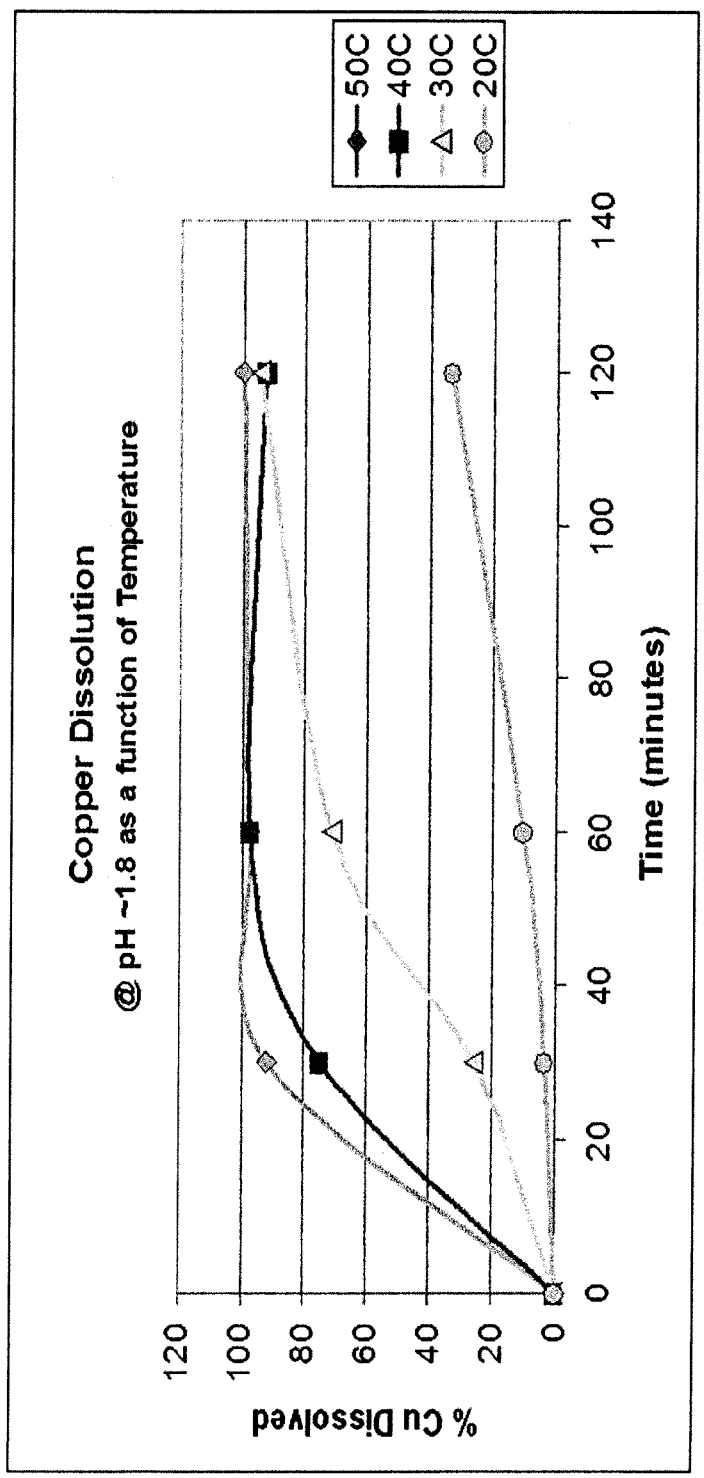
FIG. 5 shows a graph illustrating copper dissolution in an aqueous solution having a pH of about 1.8 as a function of temperature over a time period of 120 minutes, in accordance with an embodiment of the invention.
Figure 6:
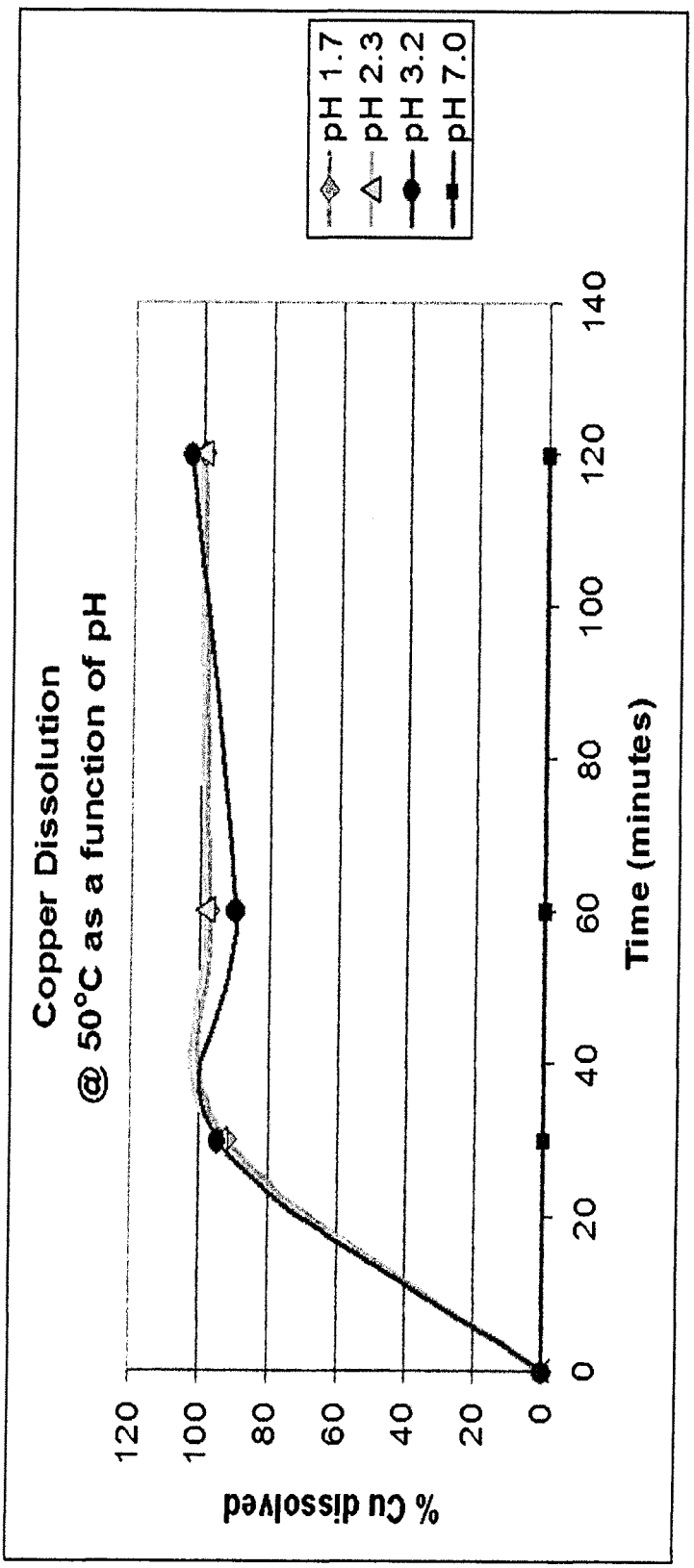
FIG. 6 shows a graph illustrating copper dissolution in an aqueous solution at 50° C. as a function of pH over a time period of 120 minutes, in accordance with an embodiment of the invention.

FIGS. 5 and 6 show graphs illustrating the effectiveness of an oxidizer, such as sodium persulfate or milled EMD, for increasing the ORP of an aqueous solution for the dissolution of copper in the aqueous solution, as will be discussed in more detail through Experiments 3-9. In particular, FIG. 5 shows a graph illustrating copper dissolution in an aqueous solution having a pH of about 1.8 as a function of temperature over a time period of 120 minutes, in accordance with an embodiment of the invention. FIG. 6 shows a graph illustrating copper dissolution in an aqueous solution at 50° C. as a function of pH over a time period of 120 minutes, in accordance with an embodiment of the invention.

For each of Experiments 3-9, as will be discussed below, metallic copper powder with a size between 60 mesh and 20 mesh was added to an aqueous solution, which was stirred with an overhead agitator to suspend all copper particles. In each of these experiments, aqueous solution samples were taken after 30 min, 60 min, 90 min, and 120 min, and were subsequently analyzed for dissolved Cu by means of a spectrometer. The amount of dissolved Cu was expressed as the percentage of total amount of Cu that had been added initially.

Experiment 3

15 g of sodium persulfate was added to 750 ml of distilled water at 50° C. The pH was adjusted to 1.7 with sulfuric acid. 0.0755 g of metallic copper powder was added, while the aqueous solution was agitated. The results indicated that within the uncertainty of the measurement all Cu had been converted within the initial 30 min, which is a practical time.

Experiment 4

15 g of sodium persulfate was added to 750 ml of distilled water at 40° C. The pH was adjusted to 1.8 with sulfuric acid. 0.0777 g of metallic copper powder was added, while the aqueous solution was agitated. The results indicated that after 30 min 75% of the Cu had converted, whereas all Cu particles had been converted after 60 min, which is a practical time.

Experiment 5

15 g of sodium persulfate was added to 750 ml of distilled water at 30° C. The pH was adjusted to 1.8 with sulfuric acid. 0.0739 g of metallic copper powder was added, while the aqueous solution was agitated. The results indicated that after 30 min 26% of the Cu had converted and 72% after 60 min, whereas all Cu particles had been converted after 120 min, which is a practical time.

Experiment 6

7.5 g of sodium persulfate was added to 750 ml of distilled water at 20° C. The pH was adjusted to 1.5 with sulfuric acid. 0.0114 g of metallic copper powder was added, while the aqueous solution was agitated. The results indicated that after 30 min 4% of the Cu had converted and 11% after 60 min, whereas only 34% of all Cu particles had been converted after 120 min.

Experiment 7

15 g of sodium persulfate was added to 750 ml of distilled water at 50° C. The pH was adjusted to 2.3 with sulfuric acid. 0.0757 g of metallic copper powder was added, while the aqueous solution was agitated. The results indicated that within the uncertainty of the measurement nearly all Cu had dissolved within the initial 30 min.

Experiment 8

15 g of sodium persulfate was added to 750 ml of distilled water at 50° C. The pH was adjusted to 3.2 with sulfuric acid. 0.0741 g of metallic copper powder was added, while the aqueous solution was agitated. The results indicated that within the uncertainty of the measurement nearly all Cu had dissolved within the initial 30 min.

Experiment 9

15 g of sodium persulfate was added to 750 ml of a pH 7.0 buffer at 50° C. 0.07781 g of metallic copper powder was added, while the aqueous solution was agitated. The results indicated that within the uncertainty of the measurement none of the Cu had dissolved within the 120 min time frame of the experiment.

Experiments 3-9 demonstrate the efficacy of an aqueous solution of sodium persulfate and distilled water that has been heated to a temperature ranging from 30° C. to 50° C., where the acidity of the aqueous solution has been adjusted to a pH of less than 3.3, for the oxidation and dissolution of copper particulates added to the aqueous solution.

Experiment 10

An acidity of 150 ml of distilled water was adjusted with sulfuric acid to a pH of 1. With agitation, 1 g of sodium persulfate was added, which led to an increase in the ORP from 648 mV to 743 mV. When 6 g of EMD was added instead of the sodium persulfate, the ORP reached 931 mV.

Experiment 11

With agitation, 2.3 g of milled EMD were added to 100 ml of acidified distilled water of pH 0.89 at room temperature. The pH of the aqueous solution was kept steady. Once 2 grams of a high-chromium tool steel was added, the pH started rising. After 6 min, the pH reached 2.32, indicating that the acid was consumed due to the solubilization of the steel. At experiment completion, only 0.4 grams of residue remained.

Experiments 10 and 11 demonstrate that EMD increases the ORP of an aqueous solution to higher levels than can be obtained using sodium persulfate, and therefore would be more effective in contributing to the conversion and dissolution of metal-containing particulates in milled EMD.

One having ordinary skill in the art will readily understand that the invention as discussed above may be practiced with steps in a different order than those which are disclosed. Therefore, although the invention has been described based upon these preferred and non-limiting embodiments, it would be apparent to those of skill in the relevant art that certain modifications, variations, and alternative constructions would be apparent, while remaining in the spirit and scope of the invention. Thus, the Experiment embodiments do not limit the invention to the particular listed devices and technologies. In order to determine the metes and bounds of the invention, therefore, reference should be made to the appended claims.

We claim:

1. A method for preparing treated electrolytic manganese dioxide, the method comprising:
    suspending milled non-neutralized electrolytic manganese dioxide in an aqueous solution heated to a temperature above 29° C. up to boiling;
    controlling an acidity of the aqueous solution to maintain a pH of less than 3.3, but at least 1.7; and
    agitating the suspended non-neutralized milled electrolytic manganese dioxide in the aqueous solution for a predetermined amount of time selected to dissolve metal-containing particulates in the milled electrolytic manganese dioxide.

2. The method of claim 1, wherein the suspending comprises heating the aqueous solution to a temperature ranging from 30° C. to 70° C.

3. The method of claim 1, wherein the predetermined time comprises a time ranging from 30 minutes to 3 hours.

4. The method of claim 1, wherein the predetermined time comprises a time of less than 2 hours.

5. The method of claim 1, wherein the adjusting comprises adding sulfuric acid to adjust the acidity of the aqueous solution.

6. The method of claim 1, wherein the aqueous solution is not saturated with dissolved copper ions or iron ions.

7. The method of claim 1, wherein the predetermined amount of time is an amount of time between 30 minutes to 120 minutes.

* * * * *